(12) United States Patent
Lee et al.

(10) Patent No.: US 9,873,168 B2
(45) Date of Patent: Jan. 23, 2018

(54) METHOD OF LASER WELDING

(75) Inventors: Mun-Yong Lee, Busan (KR);
Mun-Jong Song, Busan (KR)

(73) Assignee: SUNGWOO HITECH CO., LTD., Pusan (KR)

(*) Notice: Subject to any disclaimer, the term of this patent is extended or adjusted under 35 U.S.C. 154(b) by 1672 days.

(21) Appl. No.: 13/316,127

(22) Filed: Dec. 9, 2011

(65) Prior Publication Data

US 2013/0119025 A1    May 16, 2013

(30) Foreign Application Priority Data

Nov. 11, 2011 (KR) .................. 10-2011-0117713

(51) Int. Cl.
| | |
|---|---|
| *B23K 26/20* | (2014.01) |
| *B23K 26/08* | (2014.01) |
| *B23K 26/244* | (2014.01) |
| *B23K 103/04* | (2006.01) |
| *B23K 101/34* | (2006.01) |
| *B23K 103/08* | (2006.01) |

(52) U.S. Cl.
CPC ........ *B23K 26/0884* (2013.01); *B23K 26/244* (2015.10); *B23K 2201/34* (2013.01); *B23K 2203/04* (2013.01); *B23K 2203/08* (2013.01)

(58) Field of Classification Search
CPC ...... B23K 26/246; B23K 26/26; B23K 26/28; B23K 26/06; B23K 2201/18; B23K 2201/185; B23K 2203/04
USPC .............. 219/121.63, 121.64, 121.8, 121.78, 219/121.79
See application file for complete search history.

(56) References Cited

U.S. PATENT DOCUMENTS

| | | | | | |
|---|---|---|---|---|---|
| 2,814,719 | A | * | 11/1957 | Wilson | 219/127 |
| 3,881,084 | A | * | 4/1975 | Baardsen | 219/121.64 |
| 4,684,779 | A | * | 8/1987 | Berlinger et al. | 219/121.64 |
| 4,745,257 | A | * | 5/1988 | Rito et al. | 219/121.64 |
| 4,866,242 | A | * | 9/1989 | Martyr | 219/121.64 |
| 5,104,032 | A | * | 4/1992 | Spies et al. | 228/173.6 |
| 5,595,670 | A | * | 1/1997 | Mombo-Caristan | 219/121.64 |

(Continued)

FOREIGN PATENT DOCUMENTS

| | | |
|---|---|---|
| CN | 102126084 A | 7/2011 |
| JP | 3115456 B2 | 12/2000 |

(Continued)

OTHER PUBLICATIONS

Search Report from Chinese Application No. 201110415746.5, dated Jun. 23, 2014.

*Primary Examiner* — David Angwin
*Assistant Examiner* — Jimmy Chou
(74) *Attorney, Agent, or Firm* — Alston & Bird LLP

(57) ABSTRACT

A method of laser welding where two steel sheets are welded by a laser beam after the two steel sheets are overlapped with a predetermined gap is disclosed.

The method includes: a stitch welding step where a laser beam of focal region is irradiated along a welding portion of the upper steel sheet and the lower steel sheet such that a molten slot is formed at the upper steel sheet along the welding portion and an heat expansion portion is formed at the lower steel sheet along the welding portion by thermal conduction; and a pattern welding step where the laser beam of focal region is irradiated along the welding portion with a predetermined pattern such that an edge of the molten slot formed at the upper steel sheet is melted together with the heat expansion portion of the lower steel sheet so as to form a molten pool.

10 Claims, 9 Drawing Sheets

(56) References Cited

U.S. PATENT DOCUMENTS

| | | | |
|---|---|---|---|
| 5,603,853 A * | 2/1997 | Mombo-Caristan | 219/121.64 |
| 5,789,718 A * | 8/1998 | Fukushima et al. | 219/83 |
| 5,841,097 A * | 11/1998 | Esaka et al. | 219/121.63 |
| RE36,612 E * | 3/2000 | Fukushima et al. | 219/83 |
| 6,380,509 B1 * | 4/2002 | Arlt | 219/121.63 |
| 6,710,283 B2 * | 3/2004 | Mori et al. | 219/121.64 |
| 6,906,281 B2 * | 6/2005 | Musselman | 219/121.64 |
| 7,385,157 B2 * | 6/2008 | Oda et al. | 219/121.63 |
| 7,510,620 B2 * | 3/2009 | Terada et al. | 156/272.8 |
| 8,350,185 B2 * | 1/2013 | Lee et al. | 219/121.64 |
| 8,607,457 B2 * | 12/2013 | Huemmer et al. | 29/890.129 |
| 2002/0142184 A1 * | 10/2002 | Mazumder et al. | 428/594 |
| 2002/0144984 A1 * | 10/2002 | Mori et al. | 219/121.64 |
| 2004/0118818 A1 * | 6/2004 | Oda et al. | 219/121.64 |
| 2004/0173587 A1 * | 9/2004 | Musselman | 219/121.64 |
| 2006/0144826 A1 * | 7/2006 | Becker et al. | 219/121.64 |
| 2006/0175301 A1 * | 8/2006 | Rippl | 219/121.8 |
| 2008/0035615 A1 * | 2/2008 | Li et al. | 219/121.63 |
| 2008/0245777 A1 * | 10/2008 | Cremerius et al. | 219/121.64 |
| 2009/0283505 A1 * | 11/2009 | Naumovski et al. | 219/121.64 |
| 2011/0139753 A1 * | 6/2011 | Lee et al. | 219/121.64 |
| 2012/0125899 A1 * | 5/2012 | Oh | 219/121.64 |
| 2013/0087540 A1 * | 4/2013 | Gu et al. | 219/121.64 |

FOREIGN PATENT DOCUMENTS

| | | |
|---|---|---|
| JP | 2002-178178 A | 6/2002 |
| JP | 2008-006465 A | 1/2008 |
| JP | 2008-049392 A | 3/2008 |
| JP | 4120408 B2 | 7/2008 |
| JP | 2009-148781 A | 7/2009 |
| JP | 2011-125928 A | 6/2011 |
| KR | 10-2010-0026125 A | 3/2010 |

* cited by examiner

METHOD OF LASER WELDING

CROSS-REFERENCE TO RELATED APPLICATION

This application claims priority to and the benefit of Korean Patent Application No. 10-2011-0117713 filed in the Korean Intellectual Property Office on Nov. 11, 2011, the entire contents of which are incorporated herein by reference.

BACKGROUND OF THE INVENTION (a) Field of the Invention

The present invention relates to a method of laser welding. More particularly, the present invention relates to a method of laser welding where two steel sheets are welded by a laser beam after the two steel sheets are overlapped with a predetermined gap.

(b) Description of the Related Art

Generally, a spot welding is mainly used as a welding method for assembling components of a vehicle body, and an arc welding or a laser welding is used at welding portions to which the spot welding cannot be applied.

Particularly, since the laser welding has merits such that a filler metal is not required, a welding speed is fast, a welding cycle is short, a heat input is low, a heat affected zone (HAZ) is small, and a deformation is small, the laser welding is increasingly used for welding the components of the vehicle body instead of the spot welding and the arc welding.

A keyhole welding using energy reflection and absorption in a focal region of a laser beam is mainly used as the laser welding. The keyhole welding is done in the focal region at which the laser beam is collected to welding materials by a lens and energy reflection and absorption occur.

That is, the laser beam collides with the welding materials in the focal region where electromagnetic wave energy of the laser beam is collected, and collision energy is converted into heat energy such that keyhole of the electromagnetic wave occurs. Accordingly, the keyhole welding is performed. The keyhole welding is a welding performed by making small hole at a molten pool due to vapor pressure when laser welding.

A laser welding system, shown in FIG. 1, welds steel sheets or plated steel sheets.

According to the laser welding system, a laser head 5 is mounted at a front end of an arm 3 of a robot 1, and the laser head 5 is connected to a laser oscillator 7 through a optical fiber.

The robot 1 is operated by a robot controller C, and the laser head 5 is moved along a welding portion of the welding material 9 by the robot 1. Therefore, the laser head 5 irradiates a laser beam LB and performs the welding process.

Recently, the components of the vehicle body are made of galvanized steel sheets as well as steel sheets. The galvanized steel sheet is a steel sheet on which zinc is plated. The galvanized steel sheet is classified into a hot dipped galvanized steel sheet and an electrolytic galvanized steel sheet according to manufacturing method. The galvanized steel sheet is increasingly used because rust that is a drawback of steel sheet is prevented. In addition, the galvanized steel sheet is economically feasible and has a high strength.

In a case that a predetermined gap is not formed between an upper and a lower galvanized steel sheets 11 and 12 when a welding is performed by using the laser beam after two galvanized steel sheets 11 and 12 are overlapped as shown in FIG. 2, explosive pores are formed at the welding portion W due to zinc gas generated by evaporation of zinc layer 13.

Accordingly, it is very important in order to weld the galvanized steel sheets 11 and 12 overlapped with each other by the laser beam that the predetermined gap between the upper and lower galvanized steel sheets 11 and 12 is maintained and the zinc vapor is discharged.

If the gap between the galvanized steel sheets 11 and 12 is small or large when the galvanized steel sheets 11 and 12 are welded by the laser beam, breakage of the welding portion W occurs and pin holes (microholes) due to sink of a welding bead is generated. Such pin holes are major causes of interfacial fractures at the welding portion W in tensile test.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method of laser welding having advantages of welding steel sheets without generation of pin hole and burn through even if a gap between the steel sheets is large when a laser welding is performed.

A method of laser welding according to one or more exemplary embodiments of the present invention performs the laser welding after an upper steel sheet and a lower steel sheet are overlapped with a predetermined gap.

In one or more exemplary embodiments, the method includes: a stitch welding step where a laser beam of focal region is irradiated along a welding portion of the upper steel sheet and the lower steel sheet such that a molten slot is formed at the upper steel sheet along the welding portion and an heat expansion portion is formed at the lower steel sheet along the welding portion by thermal conduction; and a pattern welding step where the laser beam of focal region is irradiated along the welding portion with a predetermined pattern such that an edge of the molten slot formed at the upper steel sheet is melted together with the heat expansion portion of the lower steel sheet so as to form a molten pool.

In one or more exemplary embodiments, a thickness of the upper steel sheet is the same as that of the lower steel sheet.

In one or more exemplary embodiments, the predetermined gap is 10% to 50% of the thickness of the steel sheet.

In one or more exemplary embodiments, a thickness of the upper steel sheet is different from that of the lower steel sheet, and the predetermined gap is 10% to 50% of the thickness of the upper steel sheet.

In one or more exemplary embodiments, the predetermined pattern is formed as a zigzag pattern where V-shape is repeated.

In one or more exemplary embodiments, a width of the predetermined pattern is larger than that of the molten slot.

In one or more exemplary embodiments, a pitch of the predetermined pattern is smaller than or equal to a width of the molten slot.

In one or more exemplary embodiments, each of the upper steel sheet and the lower steel sheet is a galvanized steel sheet.

<Description of symbols>

Figure 1:
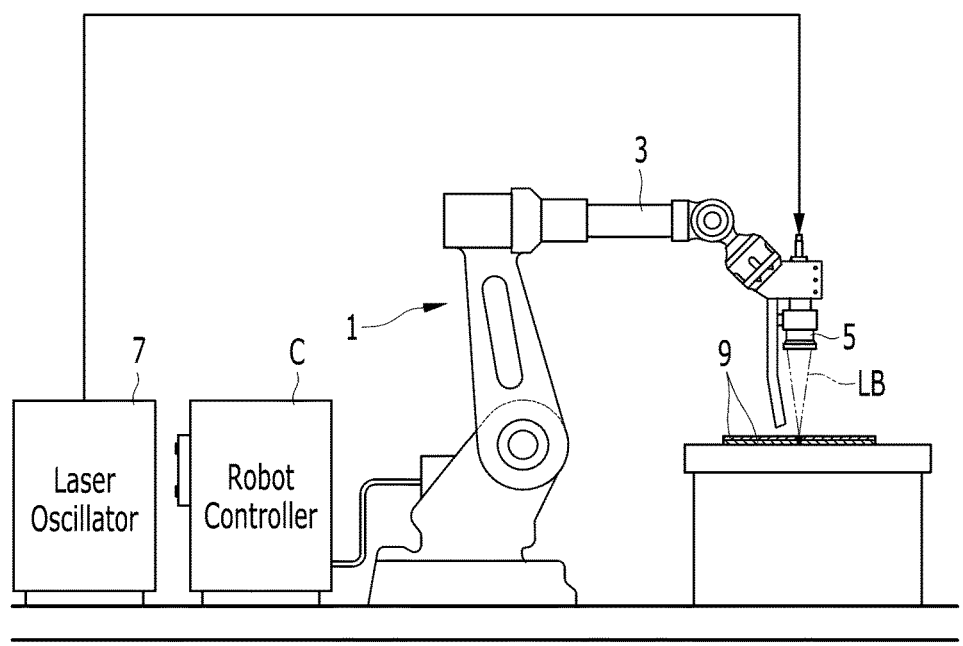
FIG. 1 is a schematic diagram of a laser welding system.
Figure 2A:
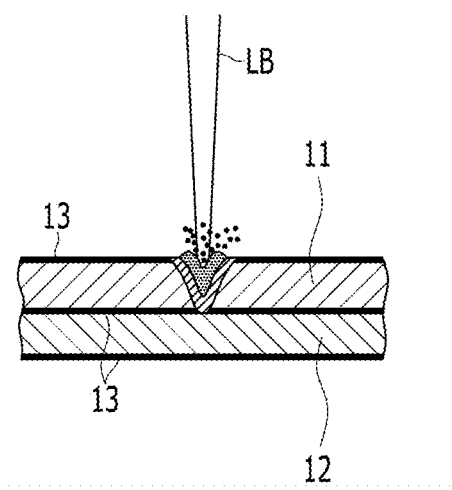
FIG. 2 is a schematic diagram for explaining problems occurring when a laser welding is performed when galvanized steel sheets are overlapped with each other.
Figure 2B:
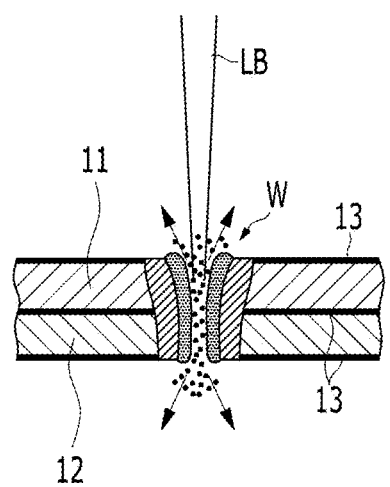

| | |
|---|---|
| 11: upper steel sheet | 12: lower steel sheet |
| 13: zinc layer | 15: molten slot |
| 17: heat expansion portion | 19: edge of molten slot |
| 21: bridge portion | 23: molten pool |
| LB: laser beam | T: thickness |
| G: gap | W: welding portion |

DETAILED DESCRIPTION OF THE EMBODIMENTS

Exemplary embodiments of the present invention will be described in detail with reference to the accompanying drawings.

Size and thickness of components shown in the drawings may be differ from real size and real thickness of the components for better comprehension and ease of description, and thicknesses of some portions and regions are drawn with enlarged scale.

In addition, description of components which are not necessary for explaining the present invention will be omitted, and the same constituent elements are denoted by the same reference numerals in this specification.

Figure 3A:
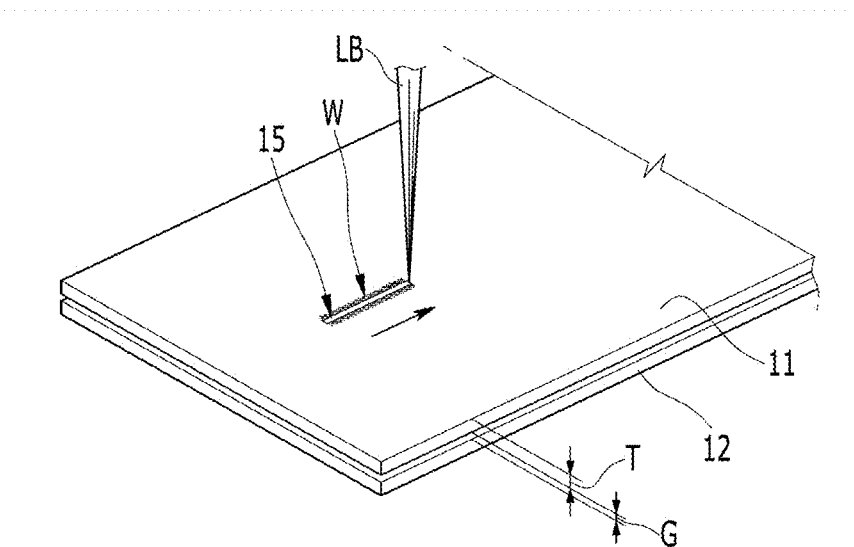
FIG. 3 is a schematic diagram for showing processes of laser welding according to an exemplary embodiment of the present invention.
Figure 3B:
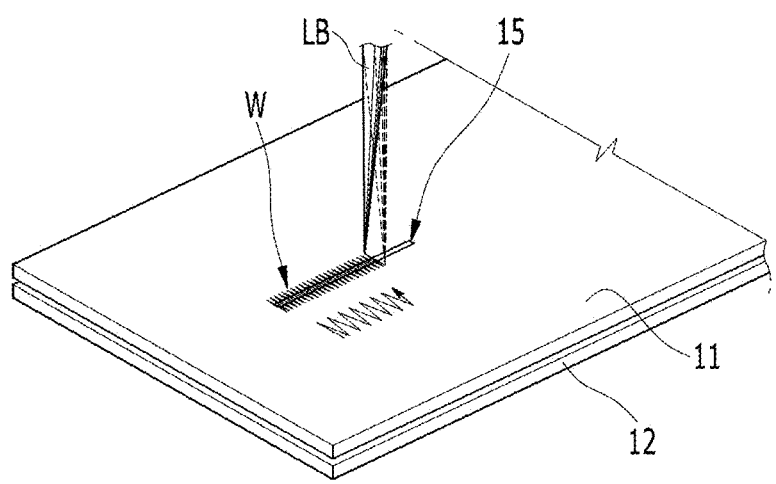
Figure 4:
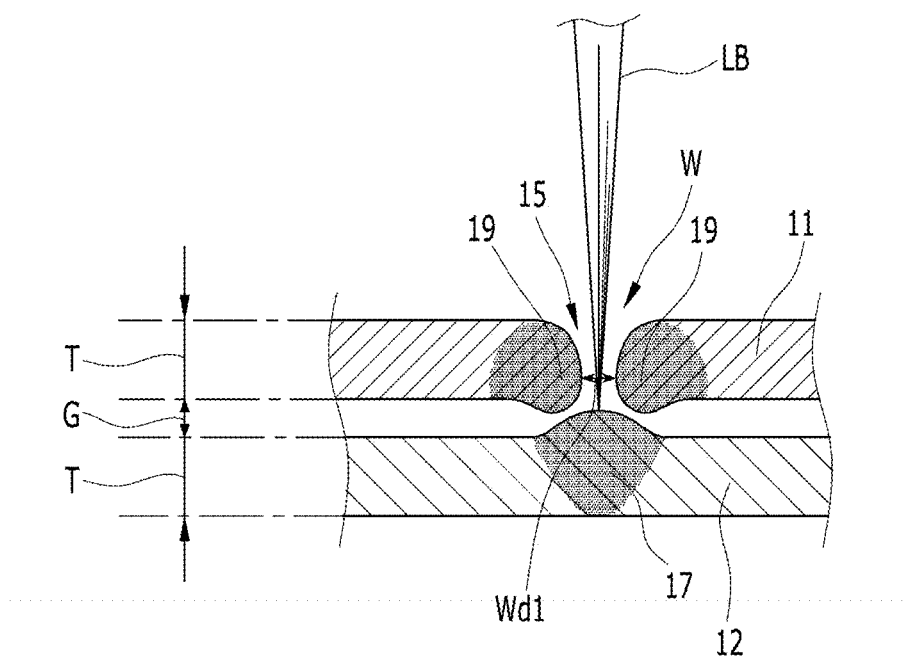
FIG. 4 is a cross-sectional view of a stitch welding portion according to an exemplary embodiment of the present invention.
Figure 5:
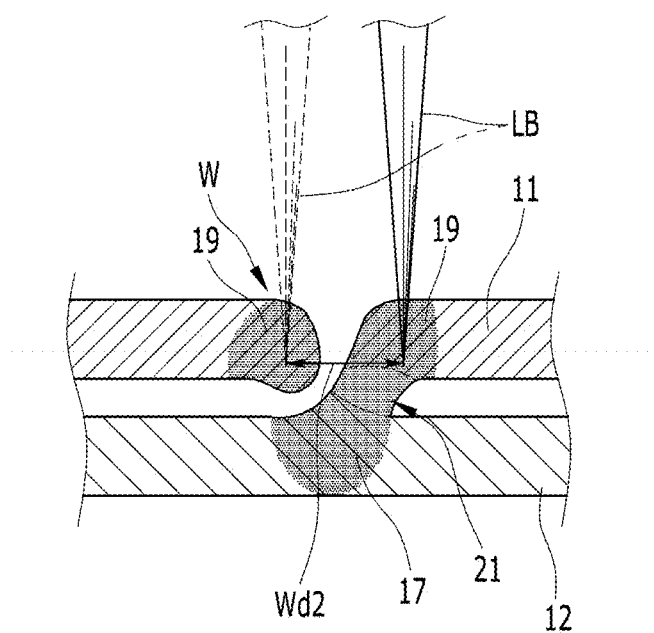
FIG. 5 is a cross-sectional view of a pattern welding portion according to an exemplary embodiment of the present invention.

FIG. 3 is a schematic diagram for showing processes of laser welding according to an exemplary embodiment of the present invention, FIG. 4 is a cross-sectional view of a stitch welding portion according to an exemplary embodiment of the present invention, FIG. 5 is a cross-sectional view of a pattern welding portion according to an exemplary embodiment of the present invention.

A method of laser welding according to an exemplary embodiment of the present invention is a method of performing a laser welding after more than two steel sheets or plated steel sheets are overlapped with each other. The method is applied to a case where a gap between two steel sheets is larger than or equal to 10% of a thickness of the steel sheets.

Referring to FIG. 3, the method of laser welding according to an exemplary embodiment of the present invention includes a stitch welding step S1 performed through an upper steel sheet 11 in a state that the upper steel sheet 11 and a lower steel sheet 12 are overlapped with a gap G, and a pattern welding step S2 performed after the stitch welding step S1 is completed.

Herein, the gap G formed between the upper steel sheet 11 and the lower steel sheet 12 is 10% to 50% of a thickness T of the steel sheet. For convenience of description, it is exemplified but is not limited that the upper steel sheet 11 and the lower steel sheet 12 have the same thickness. That is, a thickness of the upper steel sheet 11 may differ from that of the lower steel sheet 12. In this case, the gap G is 10% to 50% of the thickness of the upper steel sheet 11.

It is exemplified in the present exemplary embodiment that the upper steel sheet 11 and the lower steel sheet 12 are galvanized steel sheets, the thickness T of the steel sheets is 1.6 mm, and the gap G between the upper steel sheet 11 and the lower steel sheet 12 is 0.8 mm (i.e., the gap G is 50% of the thickness T of the steel sheets).

Referring to FIG. 4, a laser beam LB of focal region is irradiated linearly along a welding portion W of the upper steel sheet 11 and the lower steel sheet 12 overlapped with the gap G at the stitch welding step S1.

At this time, a molten slot 15 penetrating the upper steel sheet 11 is formed along the welding portion W, and a heat expansion portion 17 is formed along the welding portion W at the lower steel sheet 12 by thermal conduction.

If an output of the laser beam LB is 3,400 W and a welding speed is 30 mm/sec at the stitch welding step S1, the molten slot 15 having a width Wd1 of 0.5 mm to 0.7 mm is formed at the welding portion W of the upper steel sheet 11.

In addition, a surface of the lower steel sheet 12 is plumped up toward the molten slot 15 along the welding portion W by the thermal conduction so as to form the heat expansion portion 17.

Referring to FIG. 5, the laser beam LB of focal region is irradiated with a predetermined pattern along the welding portion W of the upper steel sheet 11 at the pattern welding step S2.

The predetermined pattern is formed as a zigzag pattern where V-shape is repeated.

That is, the laser beam LB is irradiated with the zigzag pattern along the molten slot 15 of the upper steel sheet 11 at the pattern welding step S2. In this case, an edge 19 of the molten slot 15 formed at the upper steel sheet 11 is melted and flows downwardly by gravity. The molten edge 19 is joined to the heat expansion portion 17 of the lower steel sheet 12 to form a bridge portion 21. After that, the upper steel sheet 11 and the lower steel sheet 12 are connected to each other by the bridge portion 21 and are melted together.

Figure 6A:
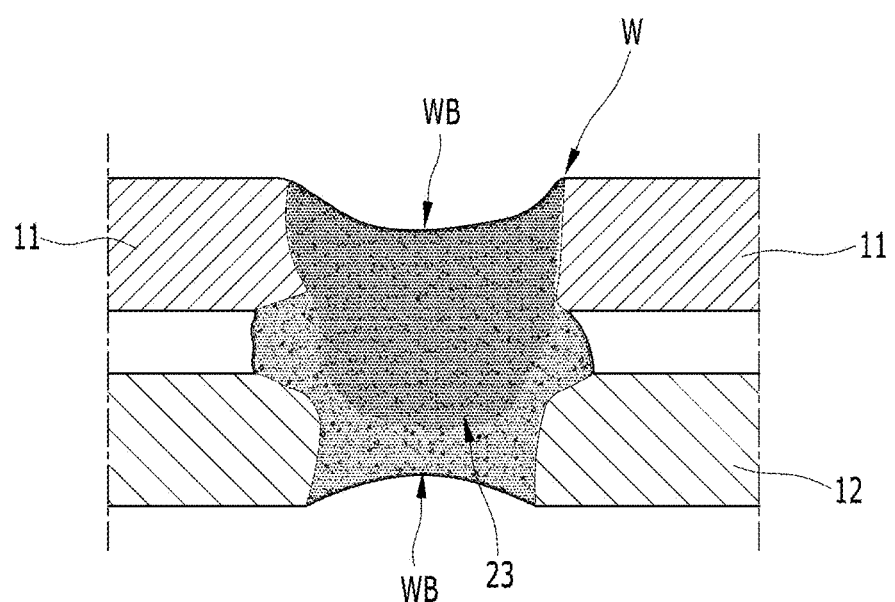
FIG. 6 is a cross-sectional view and a photograph of welding portion of galvanized steel sheets according to an exemplary embodiment of the present invention.
Figure 6B:
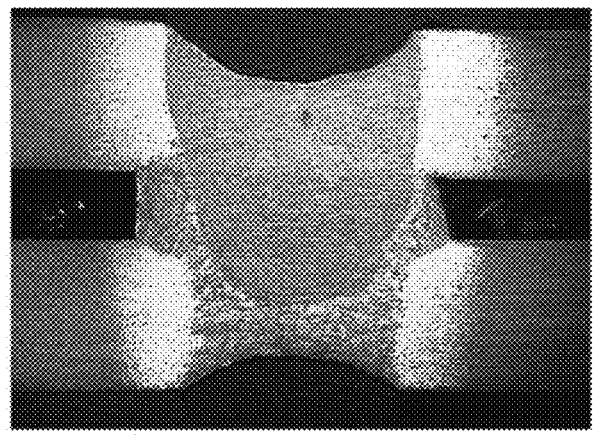

If the pattern welding processes of the laser beam LB are repeated, a molten pool 23 shown in FIG. 6 is formed at the welding portion W of the upper steel sheet 11 and the lower steel sheet 12.

A width Wd2 of the predetermined pattern is formed larger than that Wd1 of the molten slot 15.

If the output of the laser beam LB is 3,400 W, the welding speed is 300 mm/sec, and the width Wd1 of the molten slot 15 formed at the upper steel sheet 11 is 0.5 mm to 0.7 mm, it is suitable that the width Wd2 of the zigzag pattern at the pattern welding step S2 is larger than or equal to 2 mm.

At this time, a pitch of the zigzag pattern (a length by which the laser beam is moved along the welding portion during the laser beam reciprocates once to a width direction is set to 0.5 mm such that heat affected zones are overlapped. Accordingly, the edge 19 of the molten slot 15 of the upper steel sheet 11 and the heat expansion portion 17 of the lower steel sheet 12 are adapted to absorb electromagnetic wave energy of the laser beam LB sufficiently so as to form the molten pool 23. In one or more exemplary embodiments, the pitch of the zigzag pattern is smaller than or equal to the width Wd1 of the molten slot 15.

As shown in FIG. 6, even if the upper steel sheet 11 and the lower steel sheet 12 are overlapped with the gap G being larger than or equal to 10% of the thickness T, a pin hole or a burn through cannot be generated at the welding portion W according to an exemplary embodiment of the present invention. Therefore, sufficient molten width can be secured and welding quality may be improved.

In addition, the method of laser welding according to an exemplary embodiment of the present invention is applied to the case where the laser welding is performed after more than two galvanized steel sheets are overlapped. In this case, the gap G for discharging zinc gas generated by burning zinc layers coated on the galvanized steel sheets can be sufficiently secured, and poor welding according to an improper size of the gap G can be prevented in the keyhole welding. Even though a welding bead WB is sunk at the welding portion W, tensile strength and shear strength can be secured.

According to an exemplary embodiment of the present invention, a stitch welding and a zigzag pattern welding are sequentially performed when the laser welding is performed after more than two steel sheets are overlapped. Therefore, a pin hole or a burn through cannot be generated and sufficient molten width can be secured even if a gap between the steel sheets is large.

In addition, process is simple and sufficient tensile and shear strength can be secured due to the sufficient molten width.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of laser welding that performs the laser welding after an upper steel sheet and a lower steel sheet are overlapped with a predetermined gap, the method comprising:
   a stitch welding step where a laser beam of focal region is irradiated along a welding portion of the upper steel sheet and the lower steel sheet such that a molten slot comprising a first edge, second edge, and first width of the molten slot is formed through the upper steel sheet along the welding portion and a heat expansion portion is formed at the lower steel sheet along the welding portion by thermal conduction; and
   a pattern welding step where the laser beam of focal region is irradiated along the welding portion with a predetermined pattern comprising a second width formed larger than the first width of the molten slot such that an edge of the molten slot formed through the upper steel sheet is melted together with the heat expansion portion of the lower steel sheet so as to form a bridge portion, wherein a molten pool is formed in response to a plurality of formations of the bridge portion.

2. The method of claim 1, wherein a thickness of the upper steel sheet is the same as that of the lower steel sheet.

3. The method of claim 2, wherein the predetermined gap is 10% to 50% of the thickness of the upper steel sheet or the lower steel sheet.

4. The method of claim 1, wherein a thickness of the upper steel sheet is different from that of the lower steel sheet, and
   the predetermined gap is 10% to 50% of the thickness of the upper steel sheet.

5. The method of claim 1, wherein the predetermined pattern is formed as a zigzag pattern where V-shape is repeated.

6. The method of claim 5, wherein a width of the predetermined pattern is larger than that of the molten slot.

7. The method of claim 5, wherein a pitch of the predetermined pattern is smaller than or equal to a width of the molten slot.

8. The method of claim 1, wherein each of the upper steel sheet and the lower steel sheet is a galvanized steel sheet.

9. A method of laser welding that performs the laser welding after an upper steel sheet and a lower steel sheet are overlapped with a gap, the method comprising:
   a first welding step where a laser beam is irradiated along a welding portion of the upper steel sheet such that a molten slot comprising a first edge, second edge, and first width of the molten slot is formed through the upper steel sheet and a heat expansion portion corresponding to the molten slot is formed at the lower steel sheet due to thermal conduction; and
   a second welding step where a laser beam of focal region is irradiated to the molten slot of the upper steel sheet along a zigzag pattern comprising a second width formed larger than the first width of the molten slot after the first welding step is performed such that an edge of the molten slot is melted together with the heat expansion portion of the lower steel sheet so as to form a bridge portion, wherein a molten pool is formed in response to a plurality of formations of the bridge portion.

10. The method of claim 9, wherein the gap is 10% to 50% of a thickness of the upper steel sheet.

* * * * *